US012663818B2

(12) United States Patent
Zhao et al.

(10) Patent No.: US 12,663,818 B2
(45) Date of Patent: Jun. 23, 2026

(54) UNMANNED AERIAL VEHICLE RETURN FLIGHT METHOD AND APPARATUS, UNMANNED AERIAL VEHICLE, AND STORAGE MEDIUM

(71) Applicant: SZ DJI TECHNOLOGY CO., LTD., Shenzhen (CN)

(72) Inventors: Liyao Zhao, Shenzhen (CN); Yuhao Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 59 days.

(21) Appl. No.: 18/632,263

(22) Filed: Apr. 10, 2024

(65) Prior Publication Data

US 2024/0272653 A1      Aug. 15, 2024

Related U.S. Application Data

(63) Continuation of application No. PCT/CN2021/123457, filed on Oct. 13, 2021.

(51) Int. Cl.
*G05D 1/85* (2024.01)
*G05D 1/48* (2024.01)
(Continued)

(52) U.S. Cl.
CPC .............. *G05D 1/857* (2024.01); *G05D 1/48* (2024.01); *G05D 1/622* (2024.01); *G05D 1/86* (2024.01); *G06V 10/60* (2022.01); *G06V 20/56* (2022.01); *G05D 2109/20* (2024.01); *G05D 2111/17* (2024.01); *G05D 2111/20* (2024.01)

(58) Field of Classification Search
None
See application file for complete search history.

(56) References Cited

U.S. PATENT DOCUMENTS

| | | | | | |
|---|---|---|---|---|---|
| 2016/0307447 | A1* | 10/2016 | Johnson | .................. | G08G 5/34 |
| 2020/0193589 | A1* | 6/2020 | Peshlov | .............. | G06V 10/955 |

FOREIGN PATENT DOCUMENTS

| | | |
|---|---|---|
| CN | 205844824 U | 12/2016 |
| CN | 106814744 A | 6/2017 |

(Continued)

OTHER PUBLICATIONS

Yasin et al., "Unmanned Aerial Vehicles (UAVs): Collision Avoidance Systems and Approaches", IEEE Access, vol. 8, 2020, Jun. 16, 2020, pp. 105139-105155 (Year: 2020).*

(Continued)

*Primary Examiner* — Tamara L Weber

(57) ABSTRACT

A return method or device for an unmanned aerial vehicle (UAV), a UAV and a storage medium are provided. The method includes: detecting whether a sensor for obstacle avoidance fails; if the sensor fails, determining a return path of the UAV based on a first return strategy; if the sensor operates normally, determining the return path of the UAV based on a second return strategy; the first return strategy includes controlling the UAV to fly to a return altitude; the second return strategy includes determining the return path of the UAV based on detection data from the sensor. The combination of these two return strategies can achieve a balance between the return efficiency and safety of the UAV.

20 Claims, 5 Drawing Sheets

(51) Int. Cl.

| | | |
|---|---|---|
| *G05D 1/622* | (2024.01) | |
| *G05D 1/86* | (2024.01) | |
| *G06V 10/60* | (2022.01) | |
| *G06V 20/56* | (2022.01) | |
| G05D 109/20 | (2024.01) | |
| G05D 111/10 | (2024.01) | |
| G05D 111/20 | (2024.01) | |

(56)                    References Cited

FOREIGN PATENT DOCUMENTS

| | | | |
|---|---|---|---|
| CN | 109641589 A | 4/2019 | |
| CN | 111226094 A | 6/2020 | |
| CN | 112198902 A | 1/2021 | |
| JP | 2016118824 A | 6/2016 | |
| JP | 2018176846 A | 11/2018 | |

OTHER PUBLICATIONS

Cazzato et al., "A Survey of Computer Vision Methods for 2D Object Detection from Unmanned Aerial Vehicles", Journal of Imaging 2020, 6, 78, Aug. 4, 2020, pp. 1-38 (Year: 2020).*
Balestrieri et al., "Sensors and Measurements for Unmanned Systems: An Overview", Sensors 2021, 21, 1518, Feb. 22, 2021, pp. 1-27 (Year: 2021).*
Leong et al., "Vision-Based Sense and Avoid with Monocular Vision and Real-Time Object Detection for UAVs", 2021 International Conference on Unmanned Aircraft Systems (ICUAS), Jun. 15-18, 2021, pp. 1345-1354 (Year: 2021).*
Vargas et al., "An Overview of Autonomous Vehicles Sensors and Their Vulnerability to Weather Conditions", Sensors 2021, 21, 5397, Aug. 10, 2021, pp. 1-22 (Year: 2021).*
International Search Report of PCT/CN2021/123457 (Jun. 29, 2022).

* cited by examiner

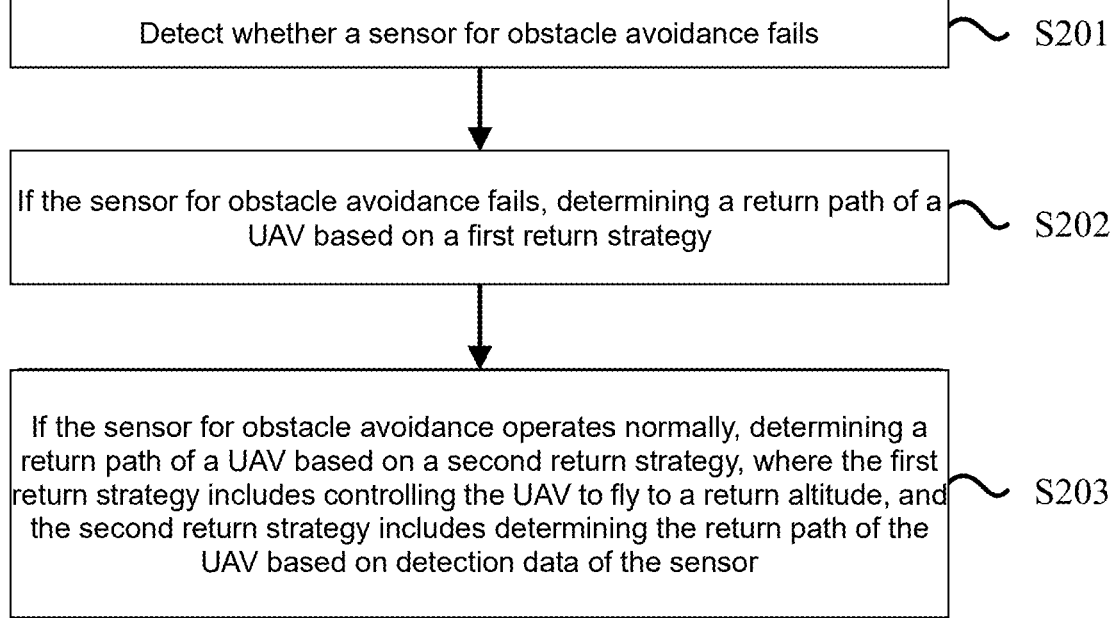

Detect whether a sensor for obstacle avoidance fails ~ S201

If the sensor for obstacle avoidance fails, determining a return path of a UAV based on a first return strategy ~ S202

If the sensor for obstacle avoidance operates normally, determining a return path of a UAV based on a second return strategy, where the first return strategy includes controlling the UAV to fly to a return altitude, and the second return strategy includes determining the return path of the UAV based on detection data of the sensor ~ S203

FIG. 2

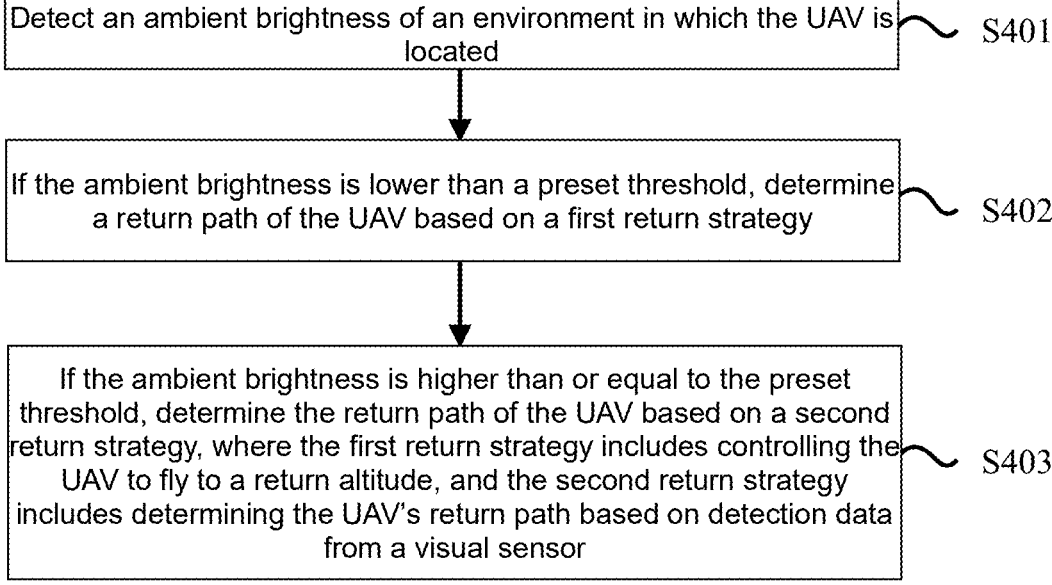

Detect an ambient brightness of an environment in which the UAV is located ~ S401

If the ambient brightness is lower than a preset threshold, determine a return path of the UAV based on a first return strategy ~ S402

If the ambient brightness is higher than or equal to the preset threshold, determine the return path of the UAV based on a second return strategy, where the first return strategy includes controlling the UAV to fly to a return altitude, and the second return strategy includes determining the UAV's return path based on detection data from a visual sensor ~ S403

FIG. 4

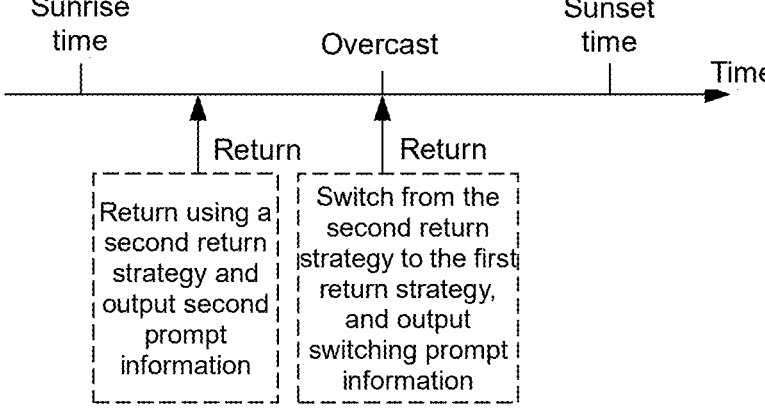

FIG. 5

UNMANNED AERIAL VEHICLE RETURN FLIGHT METHOD AND APPARATUS, UNMANNED AERIAL VEHICLE, AND STORAGE MEDIUM

RELATED APPLICATIONS

This application is a continuation application of PCT application No. PCT/CN2021/123457, filed on Oct. 13, 2021, and the content of which is incorporated herein by reference in its entirety.

COPYRIGHT NOTICE

TECHNICAL FIELD

The present disclosure relates to the technical field of unmanned aerial vehicles (UAVs), and specifically, to an unmanned aerial vehicle return flight method and apparatus, an unmanned aerial vehicle, and a storage medium.

BACKGROUND

An unmanned aerial vehicle (UAV) is an unmanned aircraft operated with radio remote control equipment and its own program control device, or operated fully or intermittently autonomously by an onboard computer. UAVs are widely used in aerial photography, agricultural plant protection, micro selfies, express transportation, disaster rescue, observing wild animals, monitoring infectious diseases, surveying and mapping, news reporting, power inspections, disaster relief, film and television shooting and other scenarios.

When a UAV returns after completing its flight mission, in order to avoid the UAV colliding with obstacles such as high buildings and mountains, the return strategy in related technologies usually allows the UAV to return at a higher return altitude to ensure flight safety. However, it takes more power and time to ascend to a higher return altitude, and the return efficiency is low. In addition, in order to ensure that there is enough power to return safely, the power (or duration) that the UAV can operate normally may also be reduced, which may lower the user experience.

SUMMARY

In view of the foregoing, one object of present disclosure is to provide a UAV return method and device, a UAV and a storage medium.

In one aspect, embodiments of the present disclosure provide a UAV return method, which includes: detecting an operating state of a sensor for obstacle avoidance; and controlling the UAV to execute a first return strategy or a second return strategy based on a detection result of the operating state of the sensor, where the first return strategy includes controlling the UAV to fly to a return altitude when the sensor fails, and the second return strategy includes determining a return path of the UAV based on detection data from the sensor when the sensor operates normally.

In another aspect, embodiments of the present disclosure provide a return method for a UAV, which includes: detecting the ambient light brightness of the current environment when the current time is between the sunrise time and the sunset time; determining that the vision sensor fails when the ambient light brightness is lower than a preset threshold; and determining that the vision sensor operates normally when the ambient light brightness is higher than or equal to the preset threshold.

In yet another aspect, embodiments of the present disclosure provide a UAV, which includes: a body; a power system in the body to provide power for the UAV; and a return device in the body, including at least one storage medium storing at least one set of instructions for returning and at least one processor in communication with the at least one storage medium, where during operation, the at least one processor executes the at least one set of instructions to cause the return device to at least: detect an operating state of a sensor for obstacle avoidance, control the UAV to execute a first return strategy or a second return strategy based on a detection result of the operating state of the sensor, where the first return strategy includes controlling the UAV to fly to a return altitude when the sensor fails, and the second return strategy includes determining a return path of the UAV based on detection data from the sensor when the sensor operates normally.

The embodiments of the present disclosure provide a UAV return method that offers two return strategies. When the sensor used for obstacle avoidance is operating normally, a second return strategy is employed, in which the UAV does not need to fly to a return altitude, but performs obstacle avoidance and returns based on the detection data of the sensor. This helps shorten the return path, save power consumption, and improve return efficiency. When the sensor used for obstacle avoidance fails, a first return strategy is employed, in which the UAV flies to the return altitude to ensure the flight safety of the UAV. The two return strategies are thus combined to achieve both return efficiency and return safety of the UAV.

BRIEF DESCRIPTION OF THE DRAWINGS

In order to clearly illustrate the technical solutions of the embodiments of the present disclosure, the following will briefly introduce the drawings for the description of some exemplary embodiments. Apparently, the accompanying drawings in the following description are some exemplary embodiments of the present disclosure. For a person of ordinary skill in the art, other drawings may also be obtained based on these drawings without creative efforts.

FIG. 2 is a schematic flow chart of a UAV return method according to some exemplary embodiments of the present disclosure;

FIG. 4 is a schematic flow chart of a UAV return method according to some exemplary embodiments of the present disclosure;

FIG. 5 is a schematic diagram of prompt information output according to some exemplary embodiments of the present disclosure;

DETAILED DESCRIPTION

The technical solutions in some exemplary embodiments of the present disclosure will be described below with reference to the accompanying drawings in the embodiments of the present disclosure. Obviously, the described embodiments are part of the embodiments of the present disclosure, but not all of the embodiments. Based on the exemplary embodiments in the present disclosure, all other embodiments obtained by a person of ordinary skill in the art without creative efforts fall within the scope of protection of the present disclosure.

Some exemplary embodiments of the present disclosure show the optimization for the return of a UAV to take into account both the return efficiency and return safety of the UAV during the return process.

It would be apparent to a person skilled in the art any type of UAV can be used without limitation. Embodiments of the present disclosure can be applied to various types of UAVs. For example, the UAVs herein can be small or large ones. In some exemplary embodiments, UAVs can be rotorcraft, such as multirotor UAVs propelled by the air with multiple propulsion devices. However, embodiments of the present disclosure are not limited to this; the UAVs can also be of other types.

Figure 1:
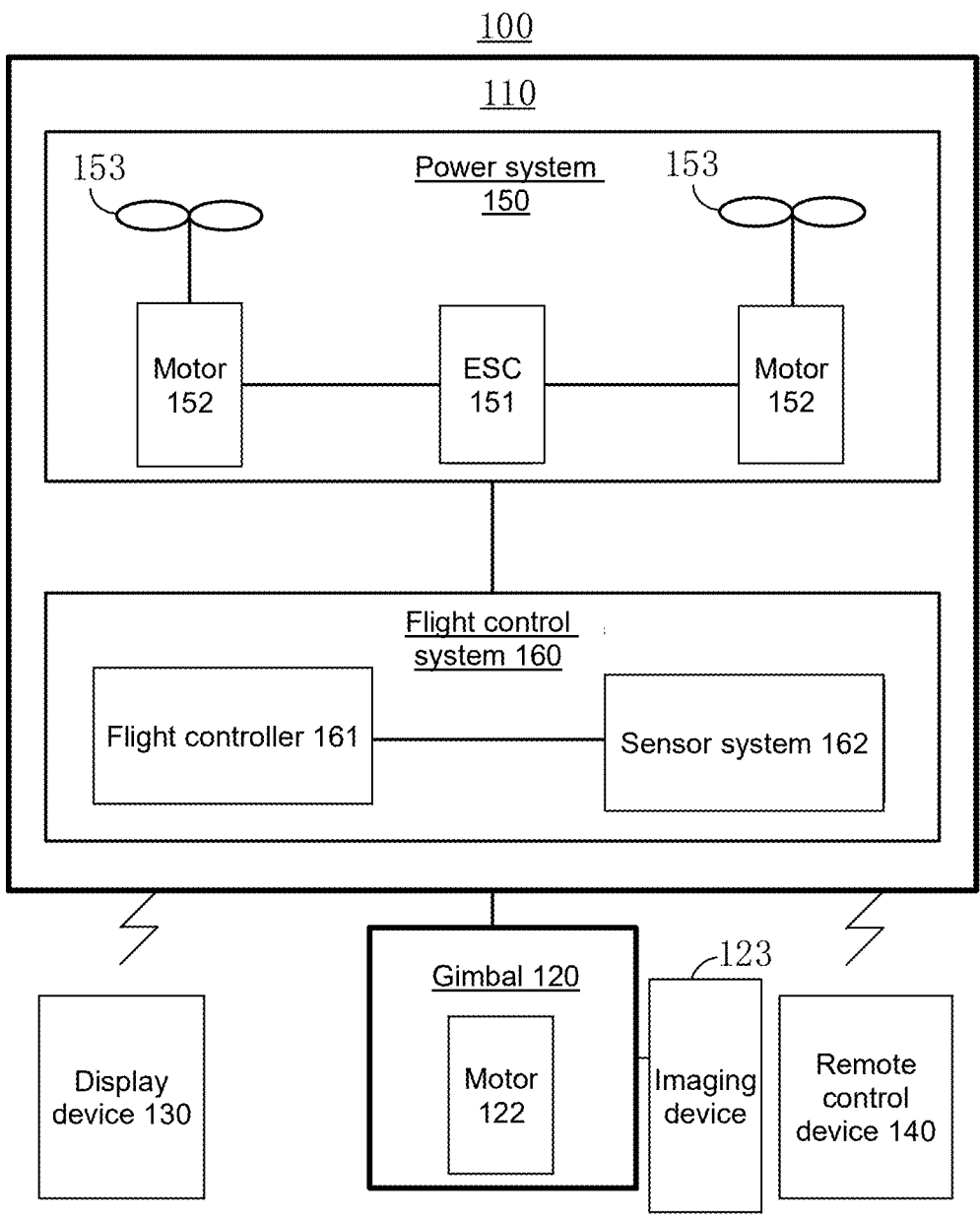
FIG. 1 is a schematic architectural diagram of an unmanned aerial system according to some exemplary embodiments of the present disclosure.

FIG. 1 is a schematic architectural diagram of an unmanned aerial system according to some exemplary embodiments of the present disclosure. This embodiment is illustrated using a rotorcraft UAV as an example.

The unmanned aerial system 100 may include a UAV 110, a display device 130, and a remote control device 140. Among them, the UAV 110 may include a power system 150, a flight control system 160, a frame, and a gimbal 120 carried on the frame. The UAV 110 may communicate wirelessly with the remote control device 140 and the display device 130. The UAV 110 can be an agricultural UAV or an industrial application UAV, which requires cyclic operations.

The frame may include a body and a landing gear. The body may include a center frame and one or more arms connected to the center frame, and the one or more arms extend radially from the center frame. The landing gear can be connected to the body to support the UAV 110 when it lands.

The power system 150 may include one or more electronic speed controllers (referred to as ESCs) 151, one or more propellers 153, and one or more motors 152 corresponding to the one or more propellers 153. The motor 152 is connected between the electronic speed controller 151 and the propeller 153, and both the motors 152 and the propellers 153 are mounted on the arms of the UAV 110. The electronic speed controller 151 is used to receive drive signals generated by the flight control system 160 and provide drive currents to the motors 152 according to these signals to control the speed of the motors 152. The motors 152 are used to drive the rotation of the propellers, thereby providing power for the flight of the UAV 110, enabling the UAV 110 to achieve one or more degrees of freedom in motion. In some exemplary embodiments, the UAV 110 can rotate about one or more axes. For example, these axes may include roll, yaw, and pitch axes. It should be understood that the motor 152 can be a DC motor or an AC motor. Additionally, the motor 152 can be a brushless motor or a brushed motor.

The flight control system 160 may include a flight controller 161 and a sensor system 162. The sensor system 162 can be used to measure the attitude information of the UAV, including spatial position and status information such as three-dimensional position, three-dimensional angle, three-dimensional velocity, three-dimensional acceleration, and three-dimensional angular velocity, etc. The sensor system 162 may include at least one sensor, such as gyroscopes, ultrasonic sensors, electronic compasses, inertial measurement units (IMUs), vision sensors, global navigation satellite systems, and barometers. For instance, the global navigation satellite system can be the Global Positioning System (GPS). The flight controller 161 is responsible for controlling the flight of the UAV, for example, it can control the flight of the UAV based on the attitude information measured by the sensor system 162. It should be understood that the flight controller 161 can control the UAV according to pre-programmed instructions or respond to one or more remote control signals from the remote control device 140.

The gimbal 120 may include a motor(s) 122. The gimbal is used to carry an imaging device 123. The flight controller 161 can control the movement of the gimbal 120 via the motor 122. Alternatively, in some exemplary embodiments, the gimbal 120 may also include a controller used to control the movement of the gimbal 120 by controlling the motor 122. It should be understood that the gimbal 120 can be independent of the UAV 110 or part of the UAV 110. The motor 122 can be a DC motor or an AC motor. Additionally, the motor 122 can be a brushless motor or a brushed motor. It should also be understood that the gimbal can be positioned at the top or bottom of the UAV.

The imaging device 123, for example, can be a camera or a video camera used to capture images. The imaging device 123 can communicate with the flight controller and capture images under the control of the flight controller. The imaging device 123 herein may include at least a photosensitive element, which can be a Complementary Metal Oxide Semiconductor (CMOS) sensor or a Charge-coupled Device (CCD) sensor. It can be understood that the imaging device 123 can also be directly mounted on the UAV 110, thereby eliminating the need for the gimbal 120.

The display device 130 is located at a ground end of the unmanned aerial system 100. It can communicate wirelessly with the UAV 110 and can be used to display the attitude information of the UAV 110. Additionally, the images captured by the imaging device 123 can be displayed on the display device 130. It should be understood that the display device 130 can be a standalone device or integrated into the remote control device 140.

The remote control device 140 is located at the ground end of the unmanned aerial system 100. It can communicate wirelessly with the UAV 110 and is used to remotely control the UAV 110.

It should be understood that the naming of various components of the unmanned aerial system above is for identification purposes only and should not be construed as limiting the embodiments of the present disclosure.

Considering that return strategies in relevant technologies often require UAVs to return at relatively high altitudes, resulting in lower efficiency and increased power consumption, which may reduce the operational battery power (or duration) of the UAV, some exemplary embodiments of the present disclosure provide a return method for UAVs. This return method can be executed by a return device of the UAV. For example, the return device can be the flight controller as illustrated in the exemplary embodiments shown in FIG. 1.

With reference to FIG. 2, FIG. 2 is a schematic flow chart of a UAV return method according to some exemplary embodiments of the present disclosure. The method includes:

Step S201, detect whether a sensor for obstacle avoidance fails.

Step S202, if the sensor for obstacle avoidance fails, determining a return path of a UAV based on a first return strategy.

Step S203, if the sensor for obstacle avoidance operates normally, determining a return path of a UAV based on a second return strategy, where the first return strategy includes controlling the UAV to fly to a return altitude, and the second return strategy includes determining the return path of the UAV based on detection data of the sensor.

In some exemplary embodiments, two return strategies are provided. When the sensor(s) used for obstacle avoidance is operating normally, the UAV does not need to fly to the return altitude. Instead, it performs obstacle-avoidance-based return using the detection data from the sensor(s). This approach is advantageous as it shortens the return path, reduces power consumption, and enhances return efficiency. In the event of sensor failure, the UAV flies to the return altitude to ensure flight safety. By combining both return strategies, a balance can be achieved between the return efficiency and safety of the UAV.

In some exemplary embodiments, during the UAV's flight, the UAV may continuously monitor in real-time whether the sensor(s) used for obstacle avoidance are malfunctioning (fail). Alternatively, in response to a return trigger for the UAV, the UAV checks whether the sensor(s) used for obstacle avoidance is malfunctioning (fails). This enables the determination of the UAV's return path based on the status of the sensor(s) (malfunctioning (failing)/normal operation), allowing for the selection of different return strategies to balance the UAV's return efficiency and safety.

The sensors used for obstacle avoidance include, but are not limited to, vision sensors, LiDAR (Light Detection and Ranging), millimeter-wave radars, or ultrasonic sensors, among others. Depending on the specific application scenario, the detection data of one of these sensors can be chosen for obstacle detection, or the detection data from multiple sensors can be fused for obstacle detection. This allows the UAV to determine whether to perform obstacle avoidance based on the obstacle detection results.

In some exemplary embodiments, there are various reasons that can cause the sensors used for obstacle avoidance to malfunction/fail.

Exemplarily, the sensors used for obstacle avoidance may fail due to internal factors, such as aging, wear, or damage to certain internal components of the sensors. In this situation, the UAV cannot receive valid signals from the sensors, indicating a potential malfunction within the sensors.

Exemplarily, the sensors used for obstacle avoidance may fail due to external factors. For example, the sensors may fail because external environmental conditions prevent them from collecting detection data that meets predefined requirements for effective obstacle detection. These predefined requirements indicate that the detection data collected by the sensors should be suitable for effective obstacle detection. In one example, taking vision sensors as an instance of sensors used for obstacle avoidance, vision sensors are sensitive to environmental brightness. For instance, in nighttime environments, the detection data collected by vision sensors may not be suitable for effective obstacle detection, leading to potential errors in obstacle detection. In this case, the detection data does not meet the predefined requirements, and the vision sensors are considered to be in a failed state. In another example, considering LiDAR sensors as an instance of sensors used for obstacle avoidance, environmental factors such as haze or dust storms can significantly affect LiDAR sensors. Laser pulses emitted by LiDAR may have difficulty penetrating through small substances such as fog, smoke, or dust particles, resulting in weak return signals collected by the LiDAR sensors. As a result, effective obstacle detection may not be possible, leading to potential errors in obstacle detection. In this case, the detection data does not meet the predefined requirements, and the LiDAR sensors are also considered to be in a failed state.

In some exemplary embodiments, taking vision sensors as an example of sensors used for obstacle avoidance, the functionality of the vision sensors can be evaluated based on environmental brightness even when the sensors themselves are not malfunctioning.

In some exemplary embodiments, the ambient light brightness of the environment where the UAV is located can be detected. If the ambient/environmental light intensity is below a predetermined threshold, it indicates that the detection data collected by the vision sensors may not be suitable for effective obstacle detection. In this case, the vision sensors may be determined to be malfunctioning. If the ambient light brightness is equal to or higher than the predetermined threshold, it indicates that the detection data collected by the vision sensor can be used for effective obstacle detection, and the vision sensors are determined to be operating normally. The specific setting of the predetermined threshold can be based on the actual application scenarios, and is not limited herein.

For detecting the ambient light brightness, when the sensor itself is not malfunctioning, the ambient light brightness can be determined based on the number of photons received by one or more photosensitive elements in the vision sensor, and/or the pixel values of pixels in one or more images captured by the vision sensor. The number of photons is directly proportional to the ambient light brightness; thus, the higher the number of photons received, the greater the ambient light brightness. Similarly, the pixel values of pixels in the captured images are also directly proportional to the ambient light brightness. For example, if the pixel values are represented by grayscale values, a higher grayscale value indicates a brighter ambient light. It's important to note that either the number of photons or the pixel values of the captured images can be used to determine the ambient light brightness, or both can be used together. This is not limited herein. The specific settings can be made based on the actual application scenarios.

Exemplarily, to improve the accuracy of detecting ambient light brightness, the ambient light brightness can be determined based on the statistical results of the number of photons received by the photosensitive elements in the vision sensor(s) and/or the pixel values of pixels in images captured by the vision sensor(s) under multiple different exposure parameters. In some exemplary embodiments, multiple sets of data may be collected and statistically analyzed to effectively eliminate individual errors and enhance the accuracy of detecting ambient light brightness. The different exposure parameters indicate different exposure levels, which can include variations in exposure duration, light input, or sensitivity.

In some exemplary embodiments, assuming there are N preset exposure parameters, where N is a positive integer, and each exposure parameter indicates a different exposure level. For instance, the exposure levels gradually increase from the 1st to the Nth exposure parameter. The UAV determines the number of photons received by the photosensitive elements in the vision sensor(s) under each of the N exposure parameters. Then, based on the statistical results of these N pieces of numbers of photons, the ambient light brightness can be determined. For example, the ambient light brightness can be determined based on statistics such as the average, median, maximum, or minimum values of these N pieces of numbers of photons. In some exemplary embodiments, by statistically analyzing the N numbers of photons together, individual errors can be effectively eliminated, thereby enhancing the accuracy of detecting ambient light brightness.

In some exemplary embodiments, due to the regularity of celestial motion in the universe, every latitude and longitude coordinate on Earth paired with a specific date corresponds to definite sunrise and sunset times. Therefore, based on the current location of the UAV and the current date, the sunrise and sunset times for that day at the UAV's location can be determined. If the current time falls between the sunrise and sunset times, indicating daytime, the ambient light brightness is generally high, and the vision sensor is considered to be operating normally. If the current time is before sunrise or after sunset, indicating nighttime, the ambient light brightness is low, and the vision sensor is considered to be malfunctioning.

The UAV's current location can be determined based on data collected by the satellite positioning device set within the UAV. The current date can be obtained by the UAV from external devices, such as via the communication with a remote control terminal. The remote control terminal can transmit relevant time information, including the current date, to the UAV. In a storage medium of the UAV, combinations of location information and date information along with corresponding sunrise and sunset times can be pre-stored. The sunrise and sunset times for the UAV's current location on a given day are determined based on the UAV's location and the current date, retrieved from the corresponding relationship stored in the UAV's storage medium.

Figure 3:
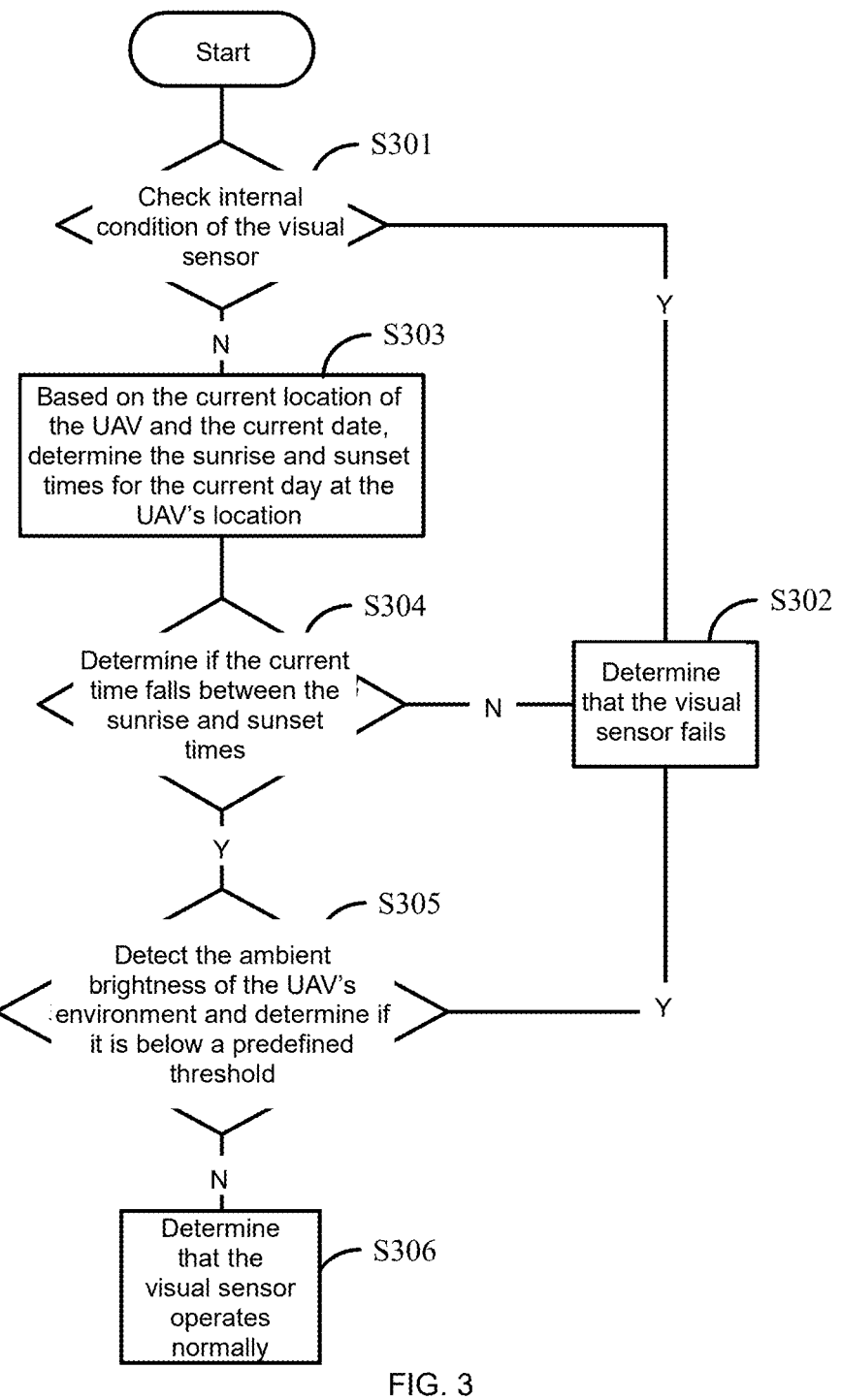
FIG. 3 is a schematic flow chart of detecting whether a vision sensor fails according to some exemplary embodiments of the present disclosure.

In some exemplary embodiments, considering that using vision sensors for ambient light detection in nighttime environments may lead to resource waste, and vision sensor failure may also occur in daytime environments, for example, when low ambient light brightness in overcast conditions may result in detection data not meeting predefined requirements, it is possible to consider integrating the above two implementation methods. As shown in FIG. 3, the process of detecting whether the vision sensor is malfunctioning/fails is illustrated.

When it is necessary to detect whether the vision sensor is malfunctioning, in step S301, the internal condition of the vision sensor is checked. For example, a query command can be sent to the vision sensor, and upon receiving a response from the vision sensor, it can be determined that there is no internal malfunction. If no response is received from the sensor within a predetermined time period, it is determined that there is an internal malfunction of the vision sensor. If there is a malfunction, step S302 is executed; if not, step S303 is executed.

Step S302, determine that the vision sensor malfunctions/fails.

Step S303, based on the current location of the UAV and the current date, determine the sunrise and sunset times for that day at the UAV's location.

Step S304, determine if the current time falls between the sunrise and sunset times. If yes, proceed to step S305; if no, meaning the current time is before sunrise or after sunset, proceed to step S302.

Step S305, detect the ambient light brightness of the UAV's environment and determine if it is below a predefined threshold. If yes, proceed to step S302; if no, proceed to step S306.

Step S306, determine that the vision sensor operates normally.

In some exemplary embodiments, in the absence of internal faults within the vision sensor, it is necessary to further detect the ambient light brightness during daytime environments to accurately determine whether the vision sensor has malfunctioned due to external environmental influences. In nighttime environments, the malfunction of the vision sensor due to external environmental influences can be directly determined without further detecting ambient light brightness. This approach is beneficial for conserving detection resources. By integrating the sunrise and sunset times of the day with real-time detection results from the vision sensor, effective detection of vision sensor malfunctions can be achieved, ensuring both detection accuracy and rational utilization of detection resources.

In some exemplary embodiments, LiDAR can be used as the obstacle avoidance sensor.

In some exemplary embodiments, in the absence of faults within the LiDAR itself, the determination of whether the LiDAR has malfunctioned can be based on the current environmental conditions, such as haze or sandstorm conditions. For example, if the LiDAR itself is not malfunctioning and the current environment is identified as hazy, it can be determined that the LiDAR has malfunctioned; otherwise, it can be determined that the LiDAR is operating normally. Exemplarily, the UAV is also equipped with a vision sensor, and the presence of a haze environment can be identified based on the images captured by the vision sensor. Exemplarily, the haze environment can be determined based on weather forecast data obtained directly or indirectly by the UAV from a preset weather platform.

In some exemplary embodiments, the storage medium of the UAV may contain pre-stored failure reference data for the LiDAR. For example, this failure reference data could be obtained from the LiDAR's readings in environments such as haze or sandstorms. The UAV can determine whether the LiDAR has malfunctioned by comparing its detection data with the stored failure reference data. For instance, if the LiDAR's detection data is similar to or differs only slightly from the failure reference data, it may be determined that the LiDAR has malfunctioned; otherwise, it is determined that the LiDAR is operating normally.

In some exemplary embodiments, taking the example where the obstacle avoidance sensor includes millimeter-wave radar, the UAV's storage medium contains pre-stored failure reference data for the millimeter-wave radar. The UAV can determine whether the millimeter-wave radar has malfunctioned by comparing its detection data with the stored failure reference data. For instance, if the millimeter-wave radar's detection data is similar to or differs only slightly from the failure reference data, it is determined that the millimeter-wave radar has malfunctioned; otherwise, it is determined that the millimeter-wave radar is operating normally.

In some exemplary embodiments, taking the example where the obstacle avoidance sensor includes an ultrasonic sensor, the UAV's storage medium contains pre-stored failure reference data for the ultrasonic sensor. For example, in cluttered environments, ultrasonic waves may undergo multiple reflections or projections, resulting in poor detection performance of the ultrasonic sensor.

Therefore, the failure reference data could be obtained from the ultrasonic sensor's readings in cluttered environments. The UAV can determine whether the ultrasonic sensor has malfunctioned by comparing its detection data with the stored failure reference data. If the ultrasonic sensor's detection data is similar to or differs only slightly from the failure reference data, it is determined that the ultrasonic sensor has malfunctioned; otherwise, it is determined that the ultrasonic sensor is operating normally.

In some exemplary embodiments, in the event of detecting a failure in the obstacle avoidance sensor, to ensure the safety of the UAV's flight, the UAV can determine its return path based on the first return strategy. The first return strategy includes controlling the UAV to ascend to a return altitude. In other words, the first return strategy instructs the UAV to ascend to the return altitude during the return process and return at that altitude. For example, the return path can be a straight-line return path. The return path indicates that the UAV ascends to the return altitude during the return, then flies to the position above the return point at the return altitude, and finally descends from above the return point to land at the return point.

Exemplarily, the return altitude may be a reference return altitude preset according to the actual application scenarios of the UAV. For example, the return altitude may be preset by the developer based on some possible flight scenarios of the UAV when the UAV leaves the factory.

Exemplarily, the return altitude can also be set by a user. Before the UAV takes off, prompt information for setting the return altitude can be output to prompt the user to set the return altitude in the first return strategy. For example, if the prompt information for setting the return altitude is displayed on a remote control terminal that is communicatively connected to the UAV, the user can flexibly set the return altitude according to the flight scenario of the UAV.

Further, considering that it is cumbersome for users to set the return height before each takeoff, in order to facilitate user use, before the UAV takes off, it can respond to the failure of the sensors used for obstacle avoidance, and output prompt information to set the return height; or when it is detected that the sensors used for obstacle avoidance are about to fail due to external factors, output prompt information to set the return height, thereby reducing the user's operating steps. In the case where the sensors used for obstacle avoidance are operating normally or it is predicted that the sensors used for obstacle avoidance can continue to operate normally, there is no need for the user to set the return height, which is beneficial to reducing the user's operating steps and improving the user experience.

In some exemplary embodiments, to illustrate the scenario where the sensors used for obstacle avoidance are about to fail due to external factors, let's consider vision sensors as an example. Time information can be utilized to determine whether the vision sensors are about to fail. For instance, if the UAV takes off when there are only 10 minutes left until sunset, there is a possibility that the UAV may return when it gets dark due to the vision sensor's failure. Alternatively, taking LiDAR as an example, weather information can be used to determine whether LiDAR is about to fail. For instance, if the UAV is performing a flight mission in a mountainous area in the morning and encounters foggy weather, the LiDAR might fail under such conditions. This can effectively predict whether the sensors used for obstacle avoidance may fail in the future, enabling users to set the height accordingly, thereby ensuring the safety of the UAV's return.

Exemplarily, the return height can also be determined based on the difference between the UAV's altitude during the return and the altitude of the return point, thereby ensuring the safety of the UAV's return. In one example, in response to the UAV's return trigger, the current altitude of the UAV and the altitude of the return point are obtained. If the current altitude of the UAV is lower than the altitude of the return point, the return height of the UAV may be determined based on the altitude of the return point and the preset safety altitude difference. The difference between the return height of the UAV and its current altitude is greater than or equal to the sum of the differences between altitude of the return point and the current altitude of the UAV, and the preset safety altitude difference. The preset safety altitude difference can provide altitude error compensation.

In some exemplary embodiments, the first return strategy includes controlling the UAV to return at the current altitude. For example, the first return strategy includes flying at the current altitude if the distance between the UAV and the return point is less than a certain distance threshold; if the distance between the UAV and the return point is greater than a certain distance threshold, the UAV is controlled to ascend to the return height and then fly to a position above the return point at that height. Even if the sensors used for obstacle avoidance fail, in most scenarios where there are few obstacles around the return point, it is relatively safe to return at the current altitude when the UAV is close to the return point. This approach helps avoid unnecessary altitude increases, which can lead to wastage of battery power.

In some exemplary embodiments, in order to improve the efficiency of the UAV's return when the sensors used for obstacle avoidance are detected to be operating normally, the second return strategy can be employed to determine the UAV's return path. The second return strategy involves determining the UAV's return path based on the detection data from the sensors. Specifically, the second return strategy suggests planning the UAV's return path based on the distribution conditions of obstacles detected by the sensors. The distribution of obstacles may be determined based on the detection data from the sensors. For example, the shortest return path for the UAV can be planned based on the distribution of obstacles detected by the sensors during a historical time period. During the UAV's return along the shortest return path, the path can be adjusted based on the real-time distribution of obstacles observed by the sensors. This adjustment ensures that the UAV executes the return mission along the adjusted shortest return path.

In some exemplary embodiments, in response to the return trigger of the UAV, when the sensors used for obstacle avoidance fail, the UAV executes the return mission along the return path determined by the first return strategy. At the same time, it can output the first prompt message, which is used to alert the user of the obstacle avoidance failure. The UAV returns using the first return strategy, for example, the first prompt message is "Obstacle avoidance failed, UAV will ascend to the return altitude." In response to the return trigger of the UAV, when the sensors used for obstacle avoidance are operating normally, the UAV executes the return mission along the return path determined by the second return strategy. At the same time, it can output the second prompt message, which is used to inform the user that the UAV is returning using the second return strategy with obstacle avoidance. For example, the second prompt message is "Sensors operating normally, autonomously planning return." The foregoing can facilitate the user's understanding of the UAV's return situation.

In some exemplary embodiments, when the sensors used for obstacle avoidance are operating normally, the UAV executes the return mission along the return path determined by the second return strategy. During the UAV's return process using the second return strategy, it can continuously detect in real-time whether the sensors used for obstacle avoidance are malfunctioning. If the sensors used for obstacle avoidance malfunction, the UAV may switch from the second return strategy to the first return strategy. The UAV then executes the return mission along the return path determined by the first return strategy to ensure flight safety. Additionally, in order to facilitate the user's understanding of the UAV's return situation, after the UAV switches from the second return strategy to the first return strategy, it can output a switching prompt message. This prompt message is used to inform the user of the obstacle avoidance failure, indicating that the UAV is returning using the first return strategy.

In some exemplary embodiments, in the event of the sensors used for obstacle avoidance failing, the UAV can execute the return mission along the return path determined by the first return strategy. During the UAV's return process using the first return strategy, it can continuously detect in real-time whether the sensors used for obstacle avoidance have resumed normal operation. If it detects that the sensors used for obstacle avoidance have resumed normal operation, considering that the UAV cannot effectively judge whether the sensors used for obstacle avoidance can continue to operate normally in this return scenario, in order to ensure flight safety, the UAV may still execute the return mission along the return path determined by the first return strategy. Additionally, during the return process, the UAV can utilize the detection data collected by the sensors used for obstacle avoidance to control the UAV's obstacle avoidance, thereby enhancing the UAV's flight safety.

In some exemplary embodiments, with reference to FIG. 4, taking vision sensors as an example of sensors used for obstacle avoidance, as shown in FIG. 4, it illustrates a schematic flow chart of a UAV return method according to some exemplary embodiments of the present disclosure. The method may include:

Step S401, detect an ambient light brightness of an environment in which the UAV is located.

Step S402, if the ambient light brightness is lower than a preset threshold, determine a return path of the UAV based on a first return strategy.

Step 403, if the ambient light brightness is higher than or equal to the preset threshold, determine the return path of the UAV based on a second return strategy, where the first return strategy includes controlling the UAV to fly to a return altitude, and the second return strategy includes determining the UAV's return path based on detection data from a vision sensor.

In some exemplary embodiments, the ambient light brightness can be used to determine whether the vision sensor is malfunctioning. In low ambient light conditions, the vision sensor may fail to collect detection data that meets the preset requirements, leading to erroneous obstacle detection results. Therefore, the return path of the UAV can be determined based on the first return strategy. The UAV flies to the return altitude to ensure flight safety. In high ambient light conditions, the vision sensor can collect detection data that meets the preset requirements for effective obstacle detection. Thus, the return path of the UAV can be determined based on the second return strategy. Obstacle-avoidance return can be conducted based on the sensor's detection data, which helps shorten the return path, save power consumption, and improve return efficiency. The combination of both return strategies can achieve a balance between UAV return efficiency and safety.

In some exemplary embodiments, the ambient light brightness may be determined based on the quantity of photons received by one or more photosensitive elements in the vision sensor(s) and/or the pixel values of pixels in the image(s) captured by one or more vision sensors.

Furthermore, the ambient light brightness may be determined based on the statistical results of the quantity of photons received by the photosensitive elements under multiple different exposure parameters and/or the statistical results of the pixel values of pixels in the images captured by the vision sensors. In some exemplary embodiments, multiple collection results can be integrated for effective statistical analysis, which can effectively eliminate individual error influences and improve the accuracy of ambient light brightness detection.

In some exemplary embodiments, the detecting of the ambient light brightness of the environment where the UAV is located may include: determining the sunrise time and sunset time of the day at the UAV's current location based on the UAV's position and the current date. If the current time falls between the sunrise and sunset times, the ambient light brightness of the UAV's environment is detected. Furthermore, if the current time is before sunrise or after sunset, the return path of the UAV is determined based on the first return strategy. In some exemplary embodiments, when there are no malfunctions in the internal vision sensors, it is necessary to further detect the ambient light brightness in daytime environments to accurately determine whether the vision sensors have failed due to external environmental factors. In nighttime environments, the vision sensors are directly determined to have failed due to external environmental factors, without the need for further ambient light brightness detection. This helps save detection resources. By integrating the sunrise and sunset times of the day with real-time detection results from the vision sensors, effective detection of vision sensor malfunctions is achieved, thereby ensuring detection accuracy while rationalizing the use of detection resources.

In some exemplary embodiments, the storage medium of the UAV pre-stores the corresponding relationship between combinations of location information and date information with sunrise and sunset times. The sunrise and sunset times of the day at the UAV's current location are determined based on the UAV's position and the current date, retrieved from the corresponding relationship stored in the storage medium.

In some exemplary embodiments, the method also includes: in response to the return trigger of the UAV, outputting a first prompt message when the ambient light brightness is below the preset threshold, and/or outputting a second prompt message when the ambient light brightness is equal to or above the preset threshold. The first prompt message is used to alert the user of obstacle avoidance failure, and the UAV returns using the first return strategy. The second prompt message is used to inform the user that the UAV is returning using the second return strategy with obstacle avoidance. In some exemplary embodiments, the output of prompt messages enables users to understand the UAV's return situation.

In some exemplary embodiments, the method may also include: during the UAV's return process using the second return strategy, if the ambient light brightness falls below the preset threshold, switching from the second return strategy to the first return strategy to ensure the UAV's flight safety. Furthermore, after switching from the second return strategy to the first return strategy, a switching prompt message is outputted; where the switching prompt message is used to inform the user of obstacle avoidance failure, indicating that the UAV is returning using the first return strategy, thereby facilitating the user's understanding of the UAV's return situation.

In some exemplary embodiments, the method may further include: during the UAV's return process using the first return strategy, if the ambient light brightness is detected to increase to a level equal to or higher than the preset threshold, controlling the UAV's obstacle avoidance based on the detection data from the vision sensor during the UAV's return process using the first return strategy, thereby improving the UAV's flight safety.

In some exemplary embodiments, the method also includes: before the UAV takes off, outputting a prompt message to set the return altitude, to prompt the user to set the return altitude in the first return strategy.

Exemplarily, the prompt message to set the return altitude may be outputted under any of the following conditions: malfunction of the vision sensor, ambient light brightness below the preset threshold, the UAV's takeoff time before sunrise or after sunset, or the UAV's takeoff time within a preset time range before sunset. The preset time range is determined based on the UAV's preset maximum flight duration, for example, the preset time range is within 30 minutes before sunset.

Exemplarily, the return altitude may be determined based on the difference between the UAV's altitude during return and the altitude of the return point.

In an exemplary application scenario, with reference to FIG. 5, if the UAV takes off during the day (i.e., between sunrise and sunset) and is returning during the day, and if the current ambient light brightness is detected to be equal to or higher than the preset threshold, the return path of the UAV is determined based on the second return strategy. Additionally, a second prompt message is outputted to inform the user that the UAV is performing obstacle-avoidance return using the second return strategy. During the UAV's return process using the second return strategy, if it encounters unfriendly scenarios for the vision sensor, such as dark clouds or strong backlight, resulting in a decrease in ambient light brightness below the preset threshold, the UAV switches from the second return strategy to the first return strategy. The UAV then flies to the return altitude and outputs a switching prompt message to notify the user of obstacle avoidance failure, indicating that the UAV will return using the first return strategy.

Figure 6:
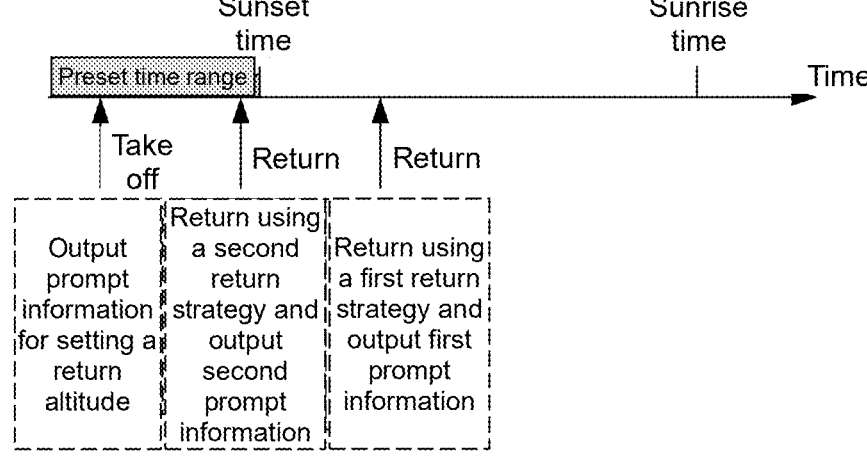
FIG. 6 is a schematic diagram of prompt information output according to some exemplary embodiments of the present disclosure.

In an exemplary application scenario, with reference to FIG. 6, if the UAV takes off within a preset time range before sunset, such as within 30 minutes before sunset, a prompt message to set the return altitude is outputted. This prompt message notifies the user to set the return altitude for the first return strategy, for instance: "This mission may encounter insufficient light leading to obstacle avoidance failure. Please set the return altitude in advance." Moreover, in response to the return trigger of the UAV, if the return occurs before sunset, the UAV returns using the second return strategy and outputs a second prompt message to inform the user that the UAV is performing obstacle-avoidance return using the second return strategy. If the return occurs after sunset, the UAV executes the return mission based on the first return strategy, flying to the return altitude set by the user and outputting the first prompt message to inform the user of obstacle avoidance failure, and that the UAV returns using the first return strategy.

In an exemplary application scenario, considering that there may also be insufficient light for a period of time after sunrise, if the UAV takes off within a preset time range after sunset and until the sunrise of the next day, a prompt message to set the return altitude is outputted. This prompt message notifies the user to set the return altitude for the first return strategy.

Figure 7:
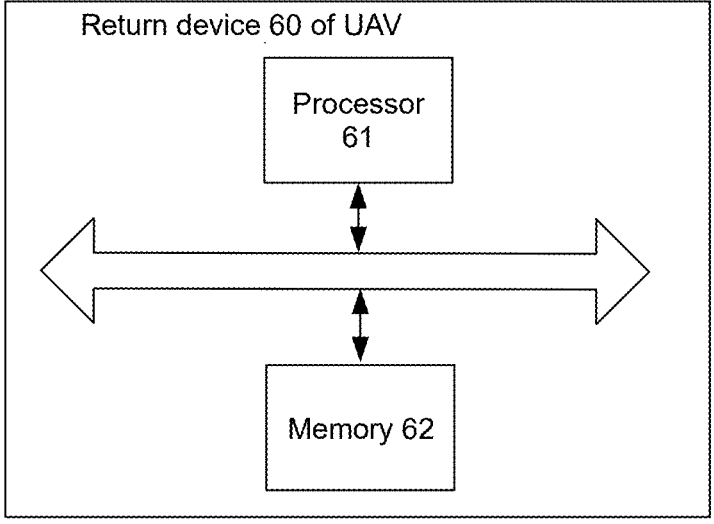
FIG. 7 is a schematic structural diagram of a UAV return device according to some exemplary embodiments of the present disclosure.

Correspondingly, with reference to FIG. 7, the present disclosure further provides a return device 60 for a UAV, including:

One or more memories/storage devices 62 for storing executable instructions;

One or more processors 61;

When the one or more processors 61 execute the executable instructions, they may individually or collectively perform any of the methods described above.

The processor(s) 61 executes the executable instructions contained in the memory (memories/storage devices) 62. The processor 61 can be a Central Processing Unit (CPU), or it can be other general-purpose processors, Digital Signal Processors (DSPs), Application Specific Integrated Circuits (ASICs), Field-Programmable Gate Arrays (FPGAs), or other programmable logic devices, discrete gates, or transistor logic devices, discrete hardware components, etc. The general-purpose processors herein can be microprocessors or any other conventional processors.

The memory (memories/storage devices) 62 stores the executable instructions for the UAV's return method. The memory 62 can include at least one type of storage medium, such as flash memory, hard disk, multimedia card, card-type storage (e.g., SD or DX storage), Random Access Memory (RAM), Static Random Access Memory (SRAM), Read-Only Memory (ROM), Electrically Erasable Programmable Read-Only Memory (EEPROM), Programmable Read-Only Memory (PROM), magnetic storage, disk, optical disk, etc. Additionally, the device can collaborate with network storage devices that perform storage functions via network connections. The memory 62 can be internal storage units, such as a hard disk or memory. It can also be external storage devices, such as plug-in hard drives, Smart Media Cards (SMCs), Secure Digital (SD) cards, flash cards, etc. Furthermore, the memory 62 can include both internal storage units and external storage devices. The memory 62 can also be used to temporarily store data that has been or will be outputted.

In some exemplary embodiments, when the processor(s) 61 executes the executable instructions, they may individually or collectively perform as follows:

Detect whether a sensor for obstacle avoidance fails/malfunctions.

If the sensors for obstacle avoidance fails/malfunctions, determine a return path of a UAV based on a first return strategy.

If the sensor for obstacle avoidance functions normally, determine the return path of the UAV based on a second return strategy.

The first return strategy includes controlling the UAV to fly to a return altitude; the second return strategy includes determining the return path of the UAV based on detection data from the sensor.

Exemplarily, the processor(s) 61 is also used to: in response to a return trigger of the UAV, output a first prompt message when the sensor for obstacle avoidance malfunctions, and/or output a second prompt message when the sensor for obstacle avoidance functions normally. The first prompt message is used to alert a user of obstacle avoidance failure and that the UAV returns using the first return strategy. The second prompt message is used to inform the user that the UAV performs obstacle-avoidance return using the second return strategy.

Exemplarily, the processor(s) 61 is also used to: in a return process of the UAV using the second return strategy, if the sensor for obstacle avoidance fails, switch from the second return strategy to the first return strategy.

Exemplarily, after switching from the second return strategy to the first return strategy, the processor(s) 61 is further used to: output switching prompt information; where the switching prompt information is used to notify the user of obstacle avoidance failure and that the UAV returns using the first return strategy.

Exemplarily, the processor(s) 61 is also used to: during the UAV's return process using the first return strategy, if it is detected that the sensor for obstacle avoidance has resumed normal operation, control the UAV to avoid obstacles based on detection data collected by the sensor for obstacle avoidance during the UAV's return process using the first return strategy.

Exemplarily, the processor(s) 61 is also used to: before the UAV takes off, output prompt information for setting the return altitude to prompt the user to set the return altitude in the first return strategy.

Exemplarily, the processor(s) 61 is further used to: in response to the failure of the sensor for obstacle avoidance, output prompt information for setting the return altitude; or if it is detected that the sensor for obstacle avoidance is about to fail due to an external factor(s), output prompt information for setting the return altitude.

Exemplarily, the return altitude is determined based on a difference between an altitude of the UAV during the return process and an altitude of a return point.

Exemplarily, the failure of the sensor for obstacle avoidance may include: the sensor fails due to internal component aging, wear, or damage, and/or the sensor fails because it cannot collect detection data that meets preset requirements.

Exemplarily, the sensor for obstacle avoidance includes at least one of the following: a vision sensor, a LiDAR, a millimeter-wave radar, or an ultrasonic sensor.

Exemplarily, the sensor for obstacle avoidance includes a vision sensor.

The processor(s) 61 is also used to: determine whether the vision sensor fails/malfunctions based on an ambient light brightness of a current environment.

Exemplarily, the processor(s) 61 is further used to: detect the ambient light brightness of the environment in which the UAV is located; if the ambient light brightness is below a preset threshold, determine that the vision sensor fails/malfunctions; if the ambient light brightness is equal to or above the preset threshold, determine that the vision sensor functions normally.

Exemplarily, the ambient light brightness is determined based on the number of photons received by a photosensitive element(s) in one or more of the vision sensors, and/or the pixel values of pixels in images collected by one or more of the vision sensors.

Exemplarily, the ambient light brightness is determined based on the statistical results of the number of photons received by the photosensitive element in the vision sensor under multiple different exposure parameters, and/or the statistical results of the pixel values of pixels in images collected by the vision sensor.

Exemplarily, the processor(s) 61 is also used to: determine the sunrise time and sunset time of the day at the location of the UAV based on the UAV's current position and the current date; if the current time is between the sunrise and sunset times, determine that the vision sensor functions normally; if the current time is before sunrise or after sunset, determine that the vision sensor malfunctions.

Exemplarily, the processor(s) 61 is also used to: if the current time is between the sunrise and sunset times, detect the ambient light brightness of the environment where the UAV is located; if the ambient light brightness is below a preset threshold, determine that the vision sensor malfunctions; if the ambient light brightness is equal to or above the preset threshold, determine that the vision sensor operates normally.

Exemplarily, the storage medium of the UAV may be preloaded with a corresponding relationship between combinations of location information and date information and the corresponding sunrise and sunset times. The sunrise time and sunset time for the UAV's current location on a given day are determined based on the UAV's current position and the current date determined based on the corresponding relationship.

Exemplarily, the sensor for obstacle avoidance includes LiDAR.

The processor(s) 61 is also used to: if the current environment is a haze environment, determine that the LiDAR fails; otherwise, determine that the LiDAR is operates normally.

Exemplarily, the UAV is equipped with a vision sensor, and the haze environment is recognized from images collected by the vision sensor.

Exemplarily, the sensor for obstacle avoidance includes a LiDAR, a millimeter-wave radar, and/or an ultrasonic sensors; the storage medium of the UAV is preloaded with reference data for the failure of LiDAR, millimeter-wave radar, and/or ultrasonic sensor.

The processor 61 is also used to: determine whether the LiDAR, millimeter-wave radar, and/or ultrasonic sensor fails/malfunctions based on a difference between detection data from the sensor and the reference data for failure.

In some exemplary embodiments, when the processor(s) 61 executes the executable instructions, it individually or collectively performs as follows:

Detect the ambient light brightness of the environment where the UAV is located;

If the ambient light brightness is below a preset threshold, determine the return path of the UAV based on the first return strategy;

If the ambient light brightness is equal to or above the preset threshold, determine the return path of the UAV based on the second return strategy;

Where the first return strategy includes controlling the UAV to fly to the return altitude; and the second return strategy includes determining the return path of the UAV based on the detection data from the vision sensor.

Exemplarily, the ambient light brightness is determined based on the number of photons received by the photosensitive elements in one or more of the vision sensors and/or the pixel values of the pixels in the images collected by the one or more vision sensors.

Exemplarily, the ambient light brightness is based on the statistical results of the number of photons received by the photosensitive elements under multiple different exposure parameters of the vision sensors and/or the statistical results of the pixel values of the pixels in images collected by the vision sensors.

Exemplarily, the processor(s) 61 is also used to: determine the sunrise time and sunset time of the day where the UAV is located based on the location of the UAV and the current date; if the current time is between the sunrise time and sunset time, detect the ambient light brightness of the environment where the UAV is located.

Exemplarily, the processor(s) 61 is also used to: if the current time is before sunrise time or after sunset time, determine the return path of the UAV based on the first return strategy.

Exemplarily, the storage medium of the UAV pre-stores the corresponding relationship between the combination of location information and date information and the sunrise and sunset times; the sunrise time and sunset time of the day where the UAV is located are based on the location of the UAV and the current date are determined based on the corresponding relationship.

Exemplarily, the processor(s) 61 is also used to: in response to a return trigger of the UAV, output a first prompt message when the ambient light brightness is below a preset threshold, and/or output a second prompt message when the ambient light brightness is equal to or above the preset threshold, where the first prompt message is used to inform the user of obstacle avoidance failure and that the UAV returns using the first return strategy; the second prompt message is used to inform the user that the UAV returns using the second return strategy with obstacle avoidance.

Exemplarily, the processor(s) 61 is also used to: during the UAV's return process using the second return strategy, if the ambient light brightness is below a preset threshold, switch from the second return strategy to the first return strategy.

Exemplarily, after switching from the second return strategy to the first return strategy, the processor(s) 61 is further used to: output a switching prompt message, where the switching prompt message is used to inform the user of obstacle avoidance failure and that the UAV returns using the first return strategy.

Exemplarily, the processor(s) 61 is also used to: during the UAV's return process using the first return strategy, if it is detected that the ambient light brightness has increased to or above the preset threshold, control the UAV to avoid obstacles based on detection data from the vision sensor during the UAV's return process using the first return strategy.

Exemplarily, the processor(s) 61 is also used to: before the UAV takes off, output prompt information for setting the return altitude to prompt the user to set the return altitude in the first return strategy.

Exemplarily, the prompt information for setting the return altitude is output under any of the following conditions: failure of the vision sensor, ambient light brightness below a preset threshold, the UAV's takeoff time before sunrise or after sunset, or the UAV's takeoff time within a preset time range before sunset.

Exemplarily, the preset time range is determined based on the UAV's preset maximum flight duration.

Exemplarily, the return altitude is determined based on the difference between the altitude of the UAV during the return and the altitude of the return point. The various exemplary embodiments described herein can be implemented using computer-readable media such as computer software, hardware, or any combination thereof. For hardware implementations, the exemplary embodiments described herein can be implemented using at least one of specific-purpose integrated circuits (ASIC), digital signal processors (DSP), digital signal processing devices (DSPD), programmable logic devices (PLD), field-programmable gate arrays (FPGA), processors, controllers, microcontrollers, microprocessors, or any electronic units designed to perform the functions described here. For software implementations, processes or functions can be implemented with separate software modules allowing the execution of at least one function or operation. Software code can be implemented by software applications (or programs) written in any suitable programming language, stored in memory, and executed by a controller.

The specific implementation processes of the functions and roles of each unit in the above devices are detailed in the implementation processes corresponding to the steps in the above methods, which will not be repeated herein.

In some exemplary embodiments, a non-transitory computer-readable storage medium containing instructions is also provided. For example, this storage medium may include a memory containing instructions that can be executed by the processor(s) of the device to complete the above method. The non-transitory computer-readable storage medium may include ROM, random-access memory (RAM), CD-ROM, tape, floppy disk, optical data storage devices, and the like.

A non-transitory computer-readable storage medium, when the instructions stored therein are executed by the processor(s) of a terminal, enables the terminal to perform the above methods.

In some exemplary embodiments, the present disclosure also provides a UAV, including:

a body;

a power system located in the body for providing power to the UAV; and the aforementioned return device disposed in the body.

Exemplarily, with reference to FIG. 1, the control device can be a flight controller in the UAV.

It should be noted that in the present disclosure, relational terms such as "first" and "second" are used solely to distinguish one entity or operation from another, and do not necessarily imply any actual relationship or order between these entities or operations. Terms such as "comprising," "including," or any other variants thereof are intended to encompass non-exclusive inclusion, so that processes, methods, items, or devices including a series of elements include not only those elements explicitly listed, but also other elements not explicitly listed, or even elements inherent to such processes, methods, items, or devices. Unless otherwise specified, the elements defined by the statement "comprising a . . . " do not exclude other identical elements in the process, method, item, or device comprising these elements.

The methods and devices provided in some exemplary embodiments of the present disclosure have been detailed above, with specific examples used to illustrate the principles and implementations of the present disclosure. The explanations of the above embodiments are provided solely to aid in understanding the methods and core concepts of the present disclosure. Additionally, for a person skilled in the art, changes may be made to the specific exemplary embodiments and applications based on the principles of the present disclosure. Therefore, the content of the present disclosure should not be construed as limiting the scope of the present disclosure.

What is claimed is:

1. A return method for an unmanned aerial vehicle (UAV), comprising:
  detecting an operating state of a sensor for obstacle avoidance; and
  controlling the UAV to execute a first return strategy or a second return strategy based on a detection result of the operating state of the sensor, wherein
  the first return strategy comprises controlling the UAV to fly to a return altitude in response to the sensor's failure to satisfy a preset obstacle detection requirement, and
  the second return strategy comprises determining a return path of the UAV based on detection data from the sensor in response to the sensor being in normal operation.

2. The method according to claim 1, further comprising at least one of:
  in response to a return trigger of the UAV, performing at least one of outputting first prompt information when the sensor fails to satisfy the preset obstacle detection requirement, or outputting second prompt information when the sensor operates normally, wherein the first prompt information prompts a user that obstacle avoidance fails and the UAV returns using the first return strategy, the second prompt information prompts the user that the UAV returns with obstacle avoidance using the second return strategy; or
  during a return process of the UAV using the second return strategy, switching the second return strategy to the first return strategy in response to the sensor's failure to satisfy the preset obstacle detection requirement.

3. The method according to claim 2, further comprising:
  outputting switching prompt information following the switching of the second return strategy to the first return strategy, wherein the switching prompt information prompts the user that the obstacle avoidance fails and the UAV returns using the first return strategy.

4. The method according to claim 1, further comprising at least one of:
  during a return process of the UAV using the first return strategy, controlling, in response to detecting that the sensor for obstacle avoidance resumes the normal operation, the UAV to avoid obstacles based on detection data collected by the sensor during the return process of the UAV using the first return strategy; or
  before the UAV takes off, outputting prompt information for setting the return altitude to prompt a user to set the return altitude in the first return strategy.

5. The method according to claim 4, wherein the outputting of the prompt information for setting the return altitude comprises at least one of:
  in response to the sensor's failure to satisfy the preset obstacle detection requirement, outputting the prompt information for setting the return altitude; or
  in response to detecting that the sensor for obstacle avoidance is about to fail to satisfy the preset obstacle detection requirement due to an external factor, outputting the prompt information for setting the return altitude.

6. The method according to claim 1, wherein the return altitude is determined based on a difference between an altitude of the UAV when returning and an altitude of a return point.

7. The method according to claim 1, wherein the sensor comprises a vision sensor; and
  the method further comprises: determining whether the vision sensor fails to satisfy the preset obstacle detection requirement based on an ambient light brightness of a current environment.

8. The method according to claim 7, wherein the determining whether the vision sensor fails to satisfy the preset obstacle detection requirement based on the ambient light brightness of the current environment comprises:
  detecting the ambient light brightness of the current environment;
  determining that the vision sensor fails to satisfy the preset obstacle detection requirement in response to when the ambient light brightness being lower than a preset threshold or determining that the vision sensor operates normally in response to the ambient light brightness being higher than the preset threshold.

9. The method according to claim 7, wherein the ambient light brightness is determined based on at least one of:
  a photon number received by a photosensitive element of the vision sensor;
  pixel values of pixels in images collected by the vision sensor;
  a statistical result of the photon number received by the photosensitive element of the vision sensor under multiple different exposure parameters; or
  a statistical result of the pixel values of pixels in the images collected by the vision sensor under the multiple different exposure parameters.

10. The method according to claim 7, further comprising:
  determining a sunrise time and a sunset time of a current date at a current location of the UAV based on information of the current location and the current date;
  determining that the vision sensor operates normally in response to current time being between the sunrise time and the sunset time; and
  determining that the vision sensor fails to satisfy the preset obstacle detection requirement in response to the current time being before the sunrise time or after the sunset time.

11. The method according to claim 10, further comprising:
  detecting the ambient light brightness of the current environment-in response to the current time being between the sunrise time and the sunset time;
  determining that the vision sensor fails to satisfy the preset obstacle detection requirement in response to the ambient light brightness being lower than a preset threshold or determining that the vision sensor operates normally in response to the ambient light brightness being higher than the preset threshold.

12. The method according to claim 10, wherein a storage medium of the UAV pre-stores a corresponding relationship between a combination of location information and date information, and information of sunrise and sunset times; and
  the sunrise time and the sunset time of the current date at the current location are determined based on the information of the current location and the current date according to the corresponding relationship.

13. The method according to claim 1, wherein the sensor for obstacle avoidance comprises a LIDAR; and the method further comprises:

determining the LiDAR fails to satisfy the preset obstacle detection requirement in response to a current environment being a haze environment; or determining the LiDAR operates normally in response to the current environment not being the haze environment.

14. The method according to claim 13, wherein the UAV is equipped with a vision sensor; and the haze environment is determined by identifying images collected by the vision sensor.

15. The method according to claim 1, wherein the sensor comprises at least one of a LiDAR, a millimeter-wave radar or an ultrasonic sensors;

a storage medium of the UAV pre-stores failure reference data of the at least one of the LiDAR, the millimeter-wave radar or the ultrasonic sensors;

a failure to satisfy the preset obstacle detection requirement of the at least one of the LiDAR, the millimeter-wave radar, or the ultrasonic sensors is determined based on a difference between detection data of the at least one of the LiDAR, the millimeter-wave radar, or the ultrasonic sensors and the failure reference data.

16. A return method for a UAV having a vision sensor, comprising:

detecting an ambient light brightness of a current environment; and controlling the UAV to perform a first return strategy or a second return strategy based on a detection result of the ambient light brightness, wherein the first return strategy comprises controlling the UAV to fly to a return altitude in response to the ambient light brightness being lower than a preset threshold, and the second return strategy comprises determining a return path of the UAV based on detection data of the vision sensor in response to the ambient light brightness being higher than the preset threshold.

17. The method according to claim 16, wherein the detecting of the ambient light brightness of the current environment-comprises:

obtaining a sunrise time and a sunset time of a current date at a current location of the UAV based on information of the current location and the current date;

detecting the ambient light brightness of the current environment-in response to current time being between the sunrise time and the sunset time; and determining the return path of the UAV based on the first return strategy in response to the current time being before the sunrise time or after the sunset time.

18. The method according to claim 17, wherein a storage medium of the UAV pre-stores a corresponding relationship between a combination of location information and date information, and information of sunrise and sunset times; and the sunrise time and the sunset time of the current date at the current location are determined based on the information of the current day and the current location according to the corresponding relationship.

19. The method according to claim 17, further comprising:

during a return process of the UAV using the second return strategy, switching the second return strategy to the first return strategy in response to the ambient light brightness being lower than the preset threshold; or during a return process of the UAV using the first return strategy, controlling the UAV to avoid obstacles based on the detection data of the vision sensor in response to the ambient light brightness being higher than the preset threshold.

20. A UAV, comprising:

a body;

a power system in the body to provide power for the UAV; and a return device in the body, comprising:

at least one storage medium storing at least one set of instructions for returning, and at least one processor in communication with the at least one storage medium, wherein during operation, the at least one processor executes the at least one set of instructions to cause the return device to at least:

detect an operating state of a sensor for obstacle avoidance, control the UAV to execute a first return strategy or a second return strategy based on a detection result of the operating state of the sensor, wherein the first return strategy comprises controlling the UAV to fly to a return altitude in response to the sensor's failure to satisfy a preset obstacle detection requirement, and the second return strategy comprises determining a return path of the UAV based on detection data from the sensor in response to the sensor being in normal operation.

\* \* \* \* \*